United States Patent
Liew et al.

(10) Patent No.: US 7,382,935 B2
(45) Date of Patent: Jun. 3, 2008

(54) HOMOGENEOUS AND PLAIN SURFACE DETECTION IN OPTICAL NAVIGATION SYSTEMS

(75) Inventors: Tong Sen Liew, Perak (MY); Shan Chong Tan, S langor (MY)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 894 days.

(21) Appl. No.: 10/703,310

(22) Filed: Nov. 7, 2003

(65) Prior Publication Data

US 2005/0099410 A1    May 12, 2005

(51) Int. Cl.
G06K 9/64    (2006.01)

(52) U.S. Cl. .......................... 382/278; 345/175

(58) Field of Classification Search ............ 382/278; 250/221

See application file for complete search history.

(56) References Cited

U.S. PATENT DOCUMENTS

| | | | |
|---|---|---|---|
| 5,515,079 A * | 5/1996 | Hauck | 345/157 |
| 5,578,817 A * | 11/1996 | Bidiville et al. | 250/221 |
| 6,219,462 B1 * | 4/2001 | Anandan et al. | 382/294 |
| 6,281,882 B1 | 8/2001 | Gordon et al. | |
| 6,455,840 B1 * | 9/2002 | Oliver et al. | 250/222.1 |
| 6,721,462 B2 * | 4/2004 | Okabayashi et al. | 382/278 |
| 6,804,412 B1 * | 10/2004 | Wilkinson | 382/278 |
| 6,873,422 B2 * | 3/2005 | Nahum et al. | 356/614 |
| 2002/0105656 A1 * | 8/2002 | Nahum et al. | 356/614 |
| 2002/0185617 A1 * | 12/2002 | Oliver et al. | 250/559.22 |
| 2003/0026457 A1 | 2/2003 | Nahum | |
| 2005/0018925 A1 * | 1/2005 | Bhagavatula et al. | 382/278 |

FOREIGN PATENT DOCUMENTS

| | | |
|---|---|---|
| DE | 44-08226 | 9/1995 |
| EP | 12-83493 | 2/2003 |
| JP | 57-004505 | 1/1982 |
| JP | 60-250235 | 12/1985 |
| JP | 07190995 A * | 7/1995 |
| JP | 07190995 A * | 7/1995 |

OTHER PUBLICATIONS

Agilent Technologies, "Optical Mice and how they Work: The Optical Mouse is a complete imaging system in a tiny package," Nov. 5, 2001.

* cited by examiner

Primary Examiner—Matthew C. Bella
Assistant Examiner—Aklilu K Woldemariam

(57) ABSTRACT

One embodiment in accordance with the invention relates to detecting a homogeneous surface. A first surface image is received. A plurality of values are generated by performing a plurality of auto correlations with the first surface image and a copy of the first surface image. The plurality of values includes a first peak value. A determination is made as to whether a normalized second peak value of the plurality of values satisfies a defined condition associated with a value. If so, a homogeneous surface image filter is utilized with a second surface image.

21 Claims, 4 Drawing Sheets

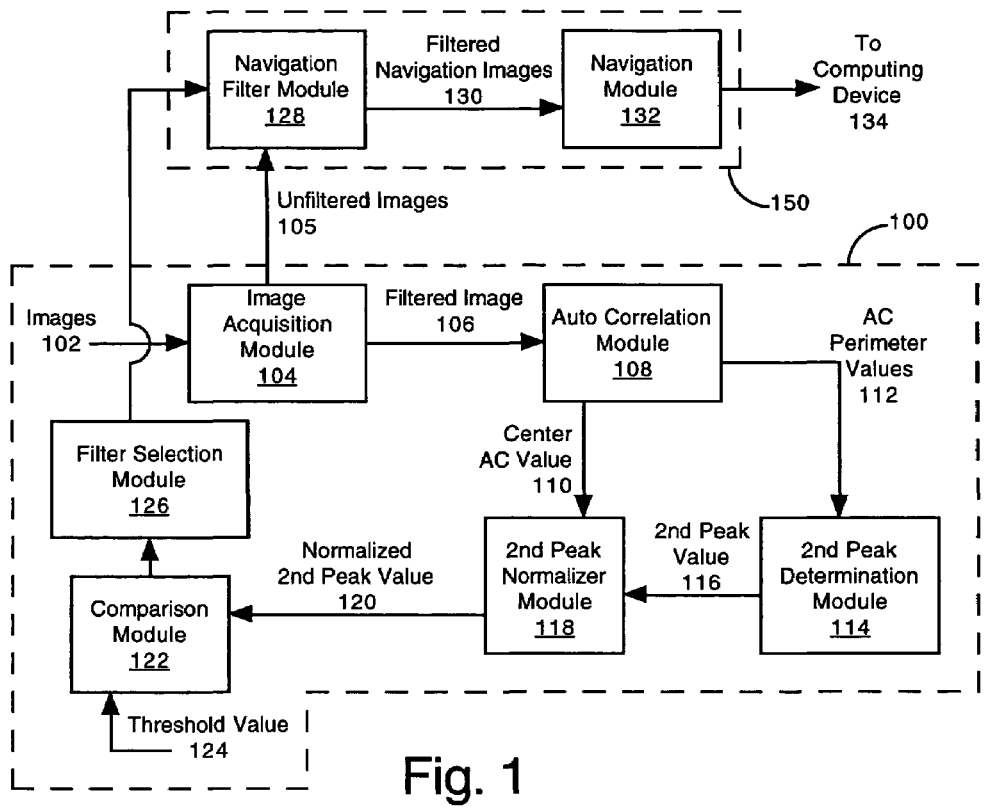

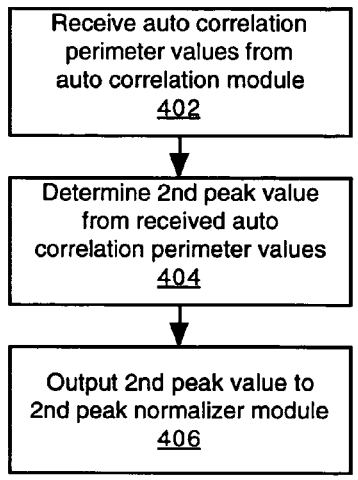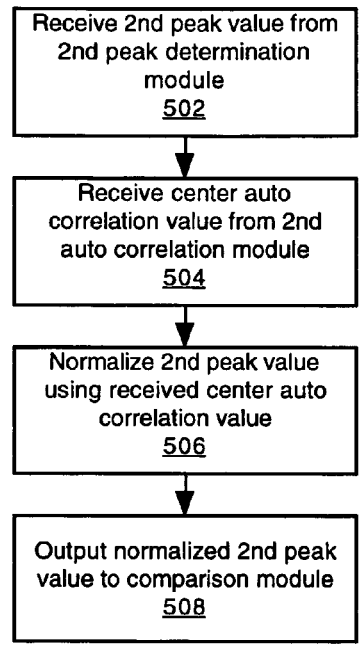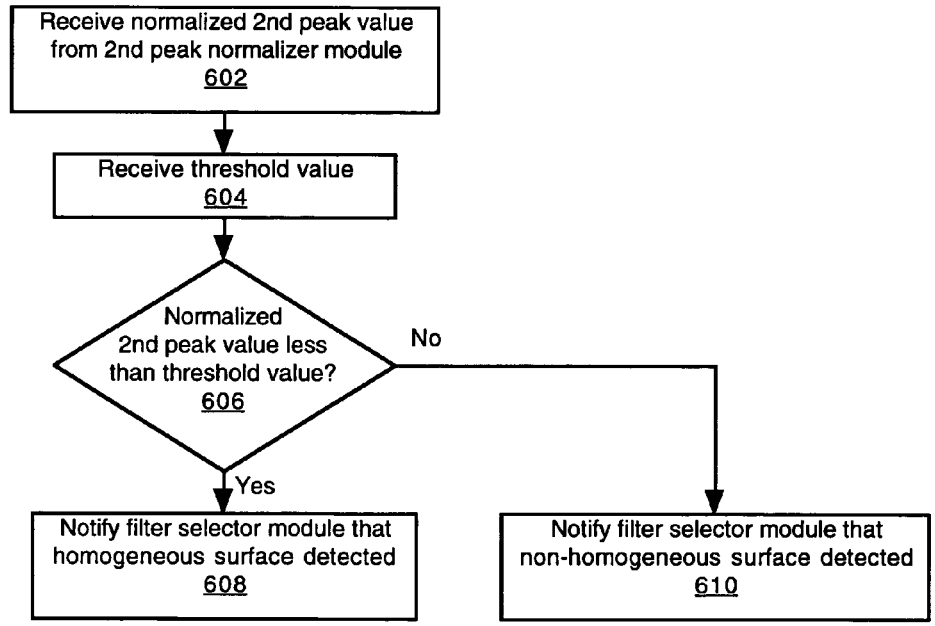

HOMOGENEOUS AND PLAIN SURFACE DETECTION IN OPTICAL NAVIGATION SYSTEMS

BACKGROUND

Conventional computer systems provide several ways for enabling a user to interact with them. One conventional technique for enabling user interaction with a computer system is for a user to utilize one or more keys of an alphanumeric keyboard communicatively connected to the computer system. Another conventional technique for enabling user interaction with a computer system is for a user to utilize a cursor control device such as a computer mouse that is communicatively connected to the computer system.

Currently, there are different types of computer mice that can be utilized in conjunction with computer systems. For example, there are traditional mechanical computer mice along with optical computer mice. Unlike traditional mechanical computer mice, optical computer mice have no moving ball that can clog with dust, dirt and/or grim. As such, users of optical computer mice no longer need to perform cleanings to any mechanical parts. In addition, the optical technology utilized within optical mice can work on many surfaces where ball mice have difficulty, including curved surfaces or soft fabric. Because of their advantages, optical computer mice are fast becoming the standard around the world.

However, there are disadvantages associated with optical computer mice. For example, one of the disadvantages associated with optical computer mice is that their tracking performance can be adversely affected depending on the type of surface they are navigated over.

SUMMARY

One embodiment in accordance with the invention provides a surface detection system for detecting a homogeneous and plain surface. The system includes an auto correlation module that generates a plurality of values by performing a plurality of auto correlations with a surface image and a copy of the surface image. The plurality of values includes a first peak value. Additionally, the system includes a second peak determination module that determines a second peak value from the plurality of values. The system also includes a second peak normalizer module that normalizes the second peak value. Furthermore, the system includes a comparison module that determines if the normalized second peak value satisfies a defined condition associated with a threshold value thus detecting the homogeneous and plain surface.

BRIEF DESCRIPTION OF THE DRAWINGS

FIG. 1 is a block diagram of a homogeneous and plain surface detection system in accordance with an embodiment of the invention.

FIG. 2 is an exemplary matrix in accordance with an embodiment of the invention.

FIG. 3 is a flowchart of operations performed by the auto correlation module of FIG. 1 in accordance with an embodiment of the invention.

FIG. 4 is a flowchart of operations performed by the second peak determination module of FIG. 1 in accordance with an embodiment of the invention.

FIG. 5 is a flowchart of operations performed by the second peak normalizer module of FIG. 1 in accordance with an embodiment of the invention.

FIG. 6 is a flowchart of operations performed by the comparison module of FIG. 1 in accordance with an embodiment of the invention.

DETAILED DESCRIPTION

Figure 7:
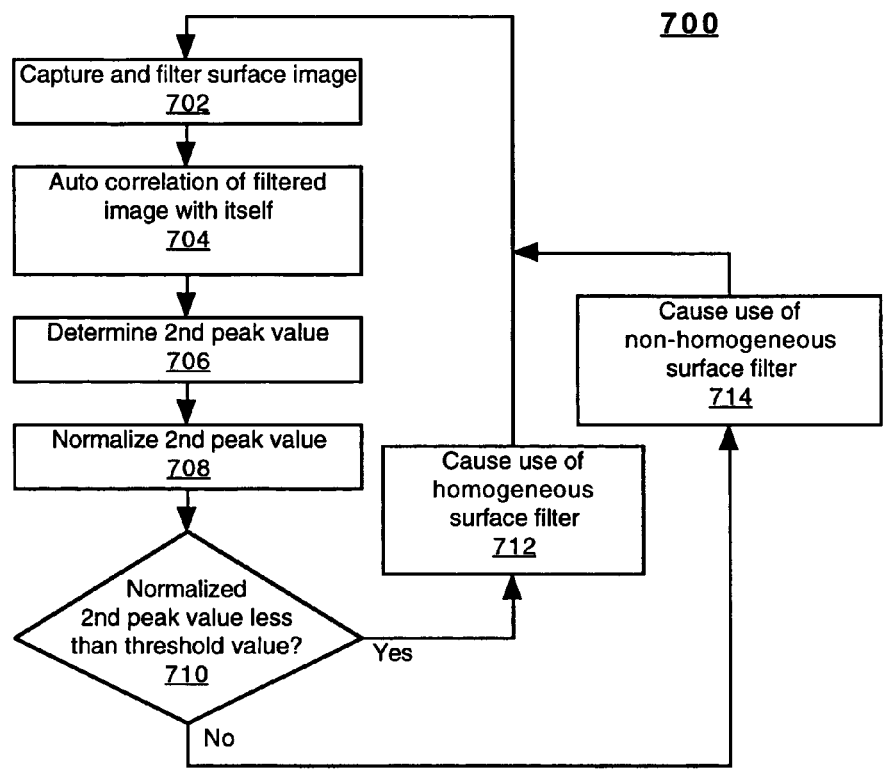
FIG. 7 is a flowchart of operations performed by an automatic homogeneous and plain surface detection system in accordance with an embodiment of the invention.

FIG. 1 is a block diagram of a homogeneous and plain surface detection system 100 in accordance with an embodiment of the invention that can be utilized in conjunction with an optical navigation system 150. For example, the homogeneous and plain surface detection system 100 may be utilized with the optical navigation system 150 that is part of an optical computer mouse. Specifically, the homogeneous and plain surface detection system 100 can be used to determine whether the optical computer mouse is navigating on a homogeneous and plain surface such as white paper. If so, the homogeneous and plain surface detection system 100 is able to cause a navigation filter module 128 to utilize an image filter specifically configured for use with images involving plain and homogeneous surfaces.

However, if the surface detection system 100 determines that the optical computer mouse is navigating on a non-homogeneous and non-plain surface, the detection system 100 causes the navigation filter module 128 to utilize an image filter specifically configured for use with images involving non-plain and non-homogeneous surfaces. In this manner, the homogeneous and plain surface detection system 100 can specifically tailor the navigation image filtering of the navigation filter module 128 to the surface that the optical computer mouse is currently encountering thereby enabling production of more accurate surface images that can be utilized by an optical navigation module 132 for improved navigational precision. It is noted that the homogeneous surface detection system 100 and the optical navigation system 150 can each be implemented by hardware or by any combination of hardware and software.

Within FIG. 1, the homogeneous and plain surface detection system 100 includes an image acquisition module 104 that can illuminate a surface area of a given object and capture images 102 of the light reflected off features of the illuminated surface area. The image acquisition module 104 can generate a series of unfiltered images 105 from the reflected light which are output to the navigation filter module 128 of optical navigation system 150. Additionally, image acquisition module 104 can also pass one of the unfiltered images 105 through processing that applies a high pass filter to it thereby producing a filtered image 106. The filtered image 106 is output by the image acquisition module 104 to an auto correlation module 108. The image acquisition module 104 is coupled to the auto correlation module 108.

The image acquisition module 104 can be implemented in a wide variety of ways in accordance with the present embodiment. For example, image acquisition module 104 may capture images at a rate of 100 images or more per second, but is not limited to such. Alternatively, the capture rate of image acquisition module 104 may be approximately 1500 images per second. Additionally, each captured image may include 100 or more pixels, but is not limited to such. It is understood that each image captured and filtered (e.g., 106) by image acquisition module 104 can be output to auto correlation module 108. Alternatively, image acquisition module 104 may not output each captured and filtered image 106 to auto correlation module 108. Instead, image acquisition module 104 may output selected filtered images (e.g., 106) to auto correlation module 108 in some periodic or non-periodic manner.

Within FIG. 1, the auto correlation module 108 receives the filtered image 106 from the image acquisition module 104. The auto correlation module 108 makes a copy of received filtered image 106 and uses both the filtered image 106 and its copy to perform multiple auto correlations to produce multiple auto correlation values. It is noted that auto correlation is well known by those of ordinary skill in the art. Auto correlation module 108 can perform an auto correlation operation for each orientation combination where X is equal to the values of −2, −1, 0, 1, and 2 while Y is equal to the values of −2, −1, 0, 1, and 2. In this manner, 24 auto correlation offset values and one auto correlation alignment value can be produced that can be arranged as a 5 by 5 matrix such as the one shown in FIG. 2.

FIG. 2 is an exemplary 5 by 5 matrix 200 that can include 25 auto correlation (ac) values in accordance with an embodiment of the invention. It is noted that within matrix 200, each entry indicates the X and Y orientation reference values utilized during the determination of its corresponding auto correlation value. For example, the notation "ac(−2,2)" of matrix 200 indicates that the auto correlation value that would be located there can be determined by performing an auto correlation with the filtered image 106 and its copy having an orientation of X=−2 and Y=2. Additionally, the notation "ac(0,0)" indicates that the auto correlation value that can be located there would be determined by performing an auto correlation with the filtered image 106 and its copy having an orientation of X=0 and Y=0. As such, the auto correlation module 108 can produce 25 auto correlation values that can be organized as matrix 200 of FIG. 2. However, it is noted that the organization of matrix 200 is not limited to that shown but can be modified in a wide variety of ways.

Once the auto correlation values of matrix 200 are determined, the auto correlation module 108 outputs the center auto correlation value 110 of matrix 200 to a second peak normalizer module 118. It is noted the center auto correlation value 110 (also known as the first peak value) of matrix 200 is represent by "ac(0,0)" in FIG. 2. Additionally, the auto correlation module 108 outputs the outer perimeter auto correlation values 112 of matrix 200 to a second peak determination module 114. The outer perimeter auto correlation values 112 of matrix 200 are represented by ac(−2,2), ac(−1,2), ac(0,2), ac(1,2), ac(2,2), ac(2,1), ac(2,0), ac(2,−1), ac(2,−2), ac(1,−2), ac(0,−2), ac(−1,−2), ac(−2,−2), ac(−2,−1), ac(−2,0), and ac(−2,1). It is understood that the auto correlation values of the outer perimeter of matrix 200 were each produced having an orientation value that included at least one of the following: X=2, X=−2, Y=2, and Y=−2. It is noted that the auto correlation module 108 is coupled to the second peak determination module 114 and the second peak normalizer module 118.

The second peak determination module 114 receives the outer perimeter auto correlation values 112 of the 5 by 5 matrix produced and output by the auto correlation module 108. Upon reception, the second peak determination module 114 determines a second peak value 116 from the received outer perimeter auto correlation values 112. Specifically, the second peak determination module 114 can determine the second peak value 116 by determining the maximum value that exists within the received outer perimeter auto correlation values 112. Upon determining the second peak value 116, the second peak determination module 114 outputs it to the second peak normalizer module 118. It is appreciated that the second peak determination module 114 is coupled to the second peak normalizer module 118.

Within FIG. 1, the second peak normalizer module 118 receives the second peak value 116 from the second peak determination module 114 and the center auto correlation value 110 from the auto correlation module 108. The second peak normalizer module 118 produces a normalized second peak value 120 by utilizing the received second peak value 116 and the center auto correlation value 110. Specifically, the second peak normalizer module 118 can produce the normalized second peak value (SPN) 120 by dividing the second peak value (SP) 116 by the center auto correlation value (CAC) 110 as shown by the following relationship:

$$SPN=SP/CAC.$$

Once the normalized second peak value 120 has been determined, the second peak normalizer module 118 outputs it to a comparison module 122. It is noted that the second peak normalizer module 118 is coupled to the comparison module 122.

The comparison module 122 receives the normalized second peak value 120 from the second peak normalizer module 118. Additionally, the comparison module 122 is also coupled to receive a threshold value 124. The comparison module 122 then compares the normalized second peak value 120 with the threshold value 124 in order to determine whether the normalized second peak value 120 is less than the threshold value 124. If so, the comparison module 122 has determined that a homogeneous and plain surface has been detected. However, if the normalized second peak value 120 is greater than or equal to the threshold value 124, the comparison module 122 has determined that a non-homogeneous and non-plain surface has been detected. As such, the comparison module 122 outputs a signal to a filter selection module 126 indicating whether or not a homogeneous and plain surface has been detected. It is appreciated that the comparison module 122 is coupled to the filter selection module 126.

Within FIG. 1, the filter selection module 126 receives the signal from the comparison module 122 that indicates whether or not a plain and homogeneous surface has been detected. If the signal indicates that a plain and homogeneous surface has been detected, the filter selection module 126 causes an image filter for plain and homogeneous surfaces to be utilized by the navigation filter module 128 of the optical navigation system 150 on the unfiltered images 105. However, if the signal indicates that a homogeneous and plain surface has not been detected, the filter selection module 126 causes an image filter for another type of surface (e.g., wood) to be utilized by navigation filter module 128 on the unfiltered images 105. It is noted that the filter selection module 126 is coupled to the navigation filter module 128.

As previously mentioned, the navigation filter module 128 of the optical navigation system 150 receives the unfiltered images 105. Depending on which image filter the filter selection module 126 directs the navigation filter module 128 to utilize, the navigation filter module 128 can apply that image filter to the unfiltered images 105 thereby producing filtered navigation images 130. The navigation filter module 128 outputs the filtered navigation images 130 to the navigation module 132. The navigation filter module 128 is coupled to the navigation module 132. It is noted that the navigation filter module 128 may be implemented to include and utilizes two or more different types of image filters.

Within FIG. 1, the optical navigation module 132 identifies the displacement of common features (e.g., patterns) in the sequential navigation images 130 thus tracking the motion thereof. Because the rate of image acquisition can be sufficiently high, much of the same features are contained within sequential images 130. Accordingly, displacement of common features in the most recent image and one or more of the previous images are identified by the optical navigation module 132. Based upon the common features, the optical navigation module 132 determines the relative movement of the device it is associated with, such as but not limited to, an optical computer mouse. This information is then translated into a corresponding series of direction and magnitude data by the optical navigation module 132. Each direction and magnitude data value is representative of the relative movement of the device (e.g., between a particular image and the next image in the series of images) associated with the optical navigation system 150 and the homogeneous and plain surface detection system 100. The series of direction and magnitude data can be output from the optical navigation engine 120 to a computer device 134 (not shown) that may interpret and display movement associated with the received series of direction and magnitude data.

The homogeneous and plain surface detection system 100 includes the image acquisition module 104, auto correlation module 108, second peak determination module 114, second peak normalizer module 118, comparison module 122, and filter selection module 126. The optical navigation system 150 includes the navigation filter module 128 and the optical navigation module 132.

FIG. 3 is a flowchart 300 of operations performed by the auto correlation module 108 of FIG. 1 in accordance with an embodiment of the invention. Although specific operations are disclosed in flowchart 300, such operations are exemplary. That is, the auto correlation module 108 is well suited to performing various other operations or variations of the operations recited in flowchart 300. It should be appreciated that the operations of flowchart 300 can be performed by software, by firmware, by hardware or by any combination thereof.

At operation 302, the auto correlation module 108 is coupled to receive the filtered image 106 from the image acquisition module 104. It is understood that the auto correlation module 108 may be coupled to the image acquisition module 104 as shown in FIG. 1. At operation 304, the auto correlation module 108 performs auto correlation on the received filtered image 106 and a copy of it in order to produce multiple auto correlation values. For example, auto correlation module 108 may perform an auto correlation for each orientation combination at X equal to −2, −1, 0, 1, and 2 while Y is equal to −2, −1, 0, 1, and 2 thereby producing 25 auto correlations values. It is noted that the 25 auto correlation values can be arranged as a 5 by 5 matrix as shown in FIG. 2, described herein.

At operation 306 of FIG. 3, the auto correlation module 108 outputs the center auto correlation value 110 (also known as the first peak value) of the 5 by 5 matrix to the second peak normalizer module 118. It is noted that the auto correlation module 108 may be coupled to the second peak normalizer module 118 as shown in FIG. 1. At operation 308, the auto correlation module 108 outputs the outer perimeter auto correlation values 112 of the 5 by 5 matrix to the second peak determination module 114. The outer perimeter auto correlation values 112 can be implemented in any manner similar to that described herein. It is appreciated that the auto correlation module 108 may be coupled to the second peak determination module 114 as shown in FIG. 1. Upon completion of operation 308, the auto correlation module 108 ends process 300.

It is understood that operations of flowchart 300 may be performed in an order different than that shown within FIG. 3. For example, operation 308 may be performed before operation 306. Alternatively, operations 306 and 308 may be performed simultaneously.

FIG. 4 is a flowchart 400 of operations performed by the second peak determination module 114 of FIG. 1 in accordance with an embodiment of the invention. Although specific operations are disclosed in flowchart 400, such operations are exemplary. That is, the second peak determination module 114 is well suited to performing various other operations or variations of the operations recited in flowchart 400. It should be understood that the operations of flowchart 400 may be performed by software, by firmware, by hardware or by any combination thereof.

At operation 402, the second peak determination module 114 receives the outer perimeter auto correlation values 112 of the 5 by 5 matrix (e.g., 200) from the auto correlation module 108. It is understood that the second peak determination module 114 may be coupled to the auto correlation module 108 as shown in FIG. 1. At operation 404, the second peak determination module 114 determines the second peak value from the received outer perimeter auto correlation values 112 of the 5 by 5 matrix. Specifically, the second peak determination module 114 can determine the second peak value 116 by determining the maximum value of the received outer perimeter auto correlation values 112.

At operation 406 of FIG. 4, the second peak determination module 114 outputs the second peak value 116 to the second peak normalizer module 118. It is appreciated that the second peak determination module 114 may be coupled to the second peak normalizer module 118 as shown in FIG. 1. Upon completion of operation 406, the second peak determination module 114 ends process 400.

FIG. 5 is a flowchart 500 of operations performed by the second peak normalizer module 118 of FIG. 1 in accordance with an embodiment of the invention. Although specific operations are disclosed in flowchart 500, such operations are exemplary. That is, the second peak normalizer module 118 is well suited to performing various other operations or variations of the operations recited in flowchart 500. It should be appreciated that the operations of flowchart 500 may be performed by software, by firmware, by hardware or by any combination thereof.

At operation 502, the second peak normalizer module 118 receives the second peak value 116 from the second peak determination module 114. It is noted that the second peak normalizer module 118 may be coupled to the second peak determination module 114 as shown in FIG. 1. At operation 504, the second peak normalizer module 118 receives the center auto correlation value 110 (also known as the first peak value) of the 5 by 5 matrix from the auto correlation module 108. It is appreciated that the second peak normalizer module 118 may be coupled to the auto correlation module 108 as shown in FIG. 1.

At operation 506 of FIG. 5, the second peak normalizer module 118 produces a normalized second peak value (e.g., 120) by utilizing the received second peak value 116 and the received center auto correlation value 110. For example, the second peak normalizer module 118 can produce at operation 506 the normalized second peak value 120 by dividing the second peak value 116 by the center auto correlation value 110. However, operation 506 is not limited to such an implementation. That is, producing the normalized second peak value at operation 506 can be implemented in diverse ways.

At operation 508, the second peak normalizer module 118 outputs the normalized second peak value 120 to the comparison module 122. It is noted that the second peak normalizer module 118 may be coupled to the comparison module 122 as shown in FIG. 1. Upon completion of operation 508, the second peak normalizer module 118 ends process 500.

FIG. 6 is a flowchart 600 of operations performed by the comparison module 122 of FIG. 1 in accordance with an embodiment of the invention. Although specific operations are disclosed in flowchart 600, such operations are exemplary. That is, the comparison module 122 is well suited to performing various other operations or variations of the operations recited in flowchart 600. It should be understood that the operations of flowchart 600 may be performed by software, by firmware, by hardware or by any combination thereof.

At operation 602, the comparison module 122 receives the normalized second peak value 120 from the second peak normalizer module 118. It is noted that the comparison module 122 may be coupled to the second peak normalizer module 118 as shown in FIG. 1. At operation 604, the comparison module 122 is coupled to receive the threshold value 124. It is noted that the threshold value 124 can be ascertain experimentally in order to determine what the upper limit of normalized second peak values (e.g., 118) would be of surfaces that are homogeneous and plain. Once a range of normalized second peak values have been determined for a specific system (e.g., 100), the threshold value 124 can be defined as a value greater than the largest determined normalized second peak value. Alternatively, the threshold value 124 can be defined as the largest determined normalized second peak value associated with homogeneous and plain surfaces. It is noted that the threshold value 124 is not limited to these embodiments. Upon reception of the threshold value 124, the comparison module 122 can store the threshold value 124 for one or more subsequent operations. It is further noted that the threshold hold value 124 may be changed as infrequently or as frequently as desired.

At operation 606 of FIG. 6, the comparison module 122 determines whether the normalized second peak value 120 is less than the threshold value 124. If the comparison module 122 determines that the normalized second peak value 120 is not less than the threshold value 124, comparison module 122 proceeds to operation 610. However, if the comparison module 122 determines that the normalized second peak value 120 is less than the threshold value 124, comparison module 122 proceeds to operation 608.

At operation 608, the comparison module 122 notifies the filter selector module 126 that a homogeneous and plain surface has been detected. It is understood that the comparison module 122 may be coupled to the filter selector module 126 as shown in FIG. 1. The comparison module 122 can notify the filter selector module at operation 608 in a wide variety of ways in accordance with the present embodiment. For example, the comparison module 122 can output a signal to the filter selector module 126 indicating that a homogeneous and plain surface has been detected. Upon completion of operation 608, the comparison module 122 ends process 600.

At operation 610, the comparison module 122 notifies the filter selector module 126 that a non-homogeneous and non-plain surface has been detected. It is noted that the comparison module 122 can notify the filter selector module at operation 610 in diverse ways in accordance with the present embodiment. For example, the comparison module 122 can output a signal to the filter selection module 126 indicating that a non-homogeneous and non-plain surface has been detected. Upon completion of operation 610, the comparison module 122 ends process 600.

FIG. 7 is a flowchart 700 of operations performed by an automatic homogeneous and plain surface detection system in accordance with an embodiment of the invention for determining whether an optical navigation system is operating on a homogeneous and plain surface. Although specific operations are disclosed in flowchart 700, such operations are exemplary. That is, the automatic homogeneous and plain surface detection system is well suited to performing various other operations or variations of the operations recited in flowchart 700. It should be appreciated that the operations of flowchart 700 may be performed by software, by firmware, by hardware or by any combination thereof.

At operation 702, the automatic homogeneous and plain surface detection system can illuminate a surface area of a given object and capture the light reflected off features of the illuminated surface area. Additionally at operation 702, once the surface image is captured, the automatic homogeneous and plain surface detection system processes the surface image by applying a high pass filter to it.

At operation 704 of FIG. 7, the automatic homogeneous and plain surface detection system generates a copy of the filtered surface image and uses both the surface image and its copy to perform multiple auto correlations to produce multiple auto correlation values. It is noted that the automatic homogeneous and plain surface detection system can perform the multiple auto correlations at operation 704 in a wide variety of ways in accordance with the present embodiment. For example, the automatic homogeneous and plain surface detection system may perform at operation 704 an auto correlation for each orientation combination when X is equal to the values of −2, −1, 0, 1, and 2 while Y is equal to the values of −2, −1, 0, 1, and 2. In this fashion, 25 auto correlation values can be produced which can be organized as a 5 by 5 matrix as shown in FIG. 2, described herein. However, it is noted that operation 704 is not limited to such an implementation.

At operation 706, the automatic homogeneous and plain surface detection system determines a second peak value from the auto correlation values of the outer perimeter of the 5 by 5 matrix. It is noted that the auto correlation values of the outer perimeter of the 5 by 5 matrix can each be produced having an orientation value that includes at least one of the following: X=2, X=−2, Y=2, and Y=−2. At operation 706, the automatic homogeneous and plain surface detection system can determine the second peak value of the auto correlation values of the outer perimeter by determining the maximum value that exists within those values.

At operation 708 of FIG. 7, the automatic homogeneous and plain surface detection system normalizes the second peak value in order to generate a normalized second peak value. It is noted that the automatic homogeneous and plain surface detection system can normalize the second peak value at operation 708 in a wide variety of ways in accordance with the present embodiment. For example, the automatic homogeneous and plain surface detection system can normalize the second peak value at operation 708 by utilizing the second peak value along with the first peak value of the multiple auto correlation values. The first peak value may also be known as the center auto correlation value of the 5 by 5 matrix. The automatic homogeneous and plain surface detection system can generate the normalized second peak value (SPN) by dividing the second peak value (SP) by the first peak value (FP) as shown by the following relationship:

SPN=SP/FP.

However, it is noted that the normalizing of the second peak value at operation 708 is not limited to such an implementation. That is, the automatic homogeneous and plain surface detection system can normalize the second peak value in diverse ways in accordance with the present embodiment.

At operation 710, the automatic homogeneous and plain surface detection system determines whether the normalized second peak value is less than a threshold value. If the automatic homogeneous and plain surface detection system determines that the normalized second peak value is greater than or equal to the threshold value at operation 710, the automatic homogeneous and plain surface detection system proceeds to operation 714 indicating that a non-homogeneous and non-plain surface has been detected. However, if the automatic homogeneous and plain surface detection system determines that the normalized second peak value is less than the threshold value at operation 710, the automatic homogeneous and plain surface detection system proceeds to operation 712 indicating that a homogeneous and plain surface has been detected.

At operation 712 of FIG. 7, the automatic homogeneous and plain surface detection system causes an image filter configured specifically for homogeneous and plain surfaces of an optical navigation system to be used with one or more subsequently captured unfiltered navigation images. In this manner, the image filtering of the optical navigation system can be specifically tailored to the surface that the optical navigation system and the automatic homogeneous and plain surface detection system are currently encountering thereby enabling production of more accurate surface images for improved navigational precision. Upon completion of operation 712, the automatic homogeneous and plain surface detection system proceeds to operation 702.

At operation 714, the automatic homogeneous and plain surface detection system causes an image filter configured specifically for non-homogeneous and non-plain surfaces of the optical navigation system to be used with one or more subsequently captured unfiltered navigation images. In this fashion, the image filtering of the optical navigation system can be specifically tailored to the non-homogeneous and non-plain surface that the optical navigation system and the automatic homogeneous and plain surface detection system are currently encountering thereby enabling production of more accurate surface images for increased navigational precision. Upon completion of operation 714, the automatic homogeneous and plain surface detection system proceeds to operation 702.

Within FIG. 7, it is noted that process 700 may be modified in accordance with the present embodiment. For example, the image filter utilized at operation 702 can be changed based on the determination performed at operation 710. In this manner, the determination of process 700 of whether an optical navigation system is operating on a homogeneous and plain surface can be improved by utilizing more appropriate image filtering.

Figure 8:
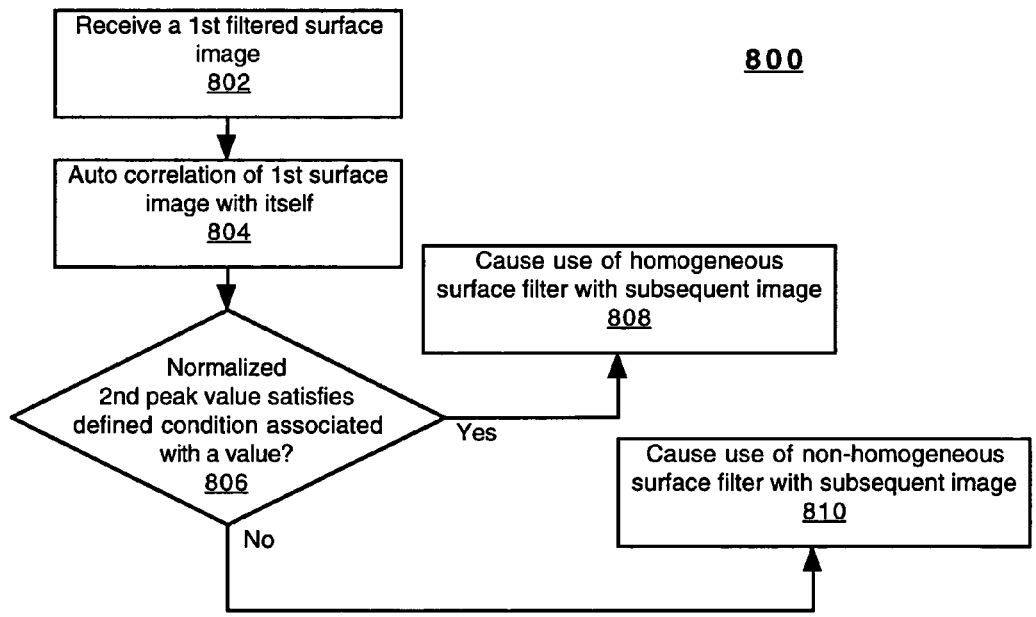
FIG. 8 is a flowchart of operations performed by a homogeneous surface detection system in accordance with an embodiment of the invention.

FIG. 8 is a flowchart 800 of operations performed by a homogeneous surface detection system in accordance with an embodiment of the invention for determining whether an optical navigation system is operating on a homogeneous surface. Although specific operations are disclosed in flowchart 800, such operations are exemplary. That is, the homogeneous surface detection system is well suited to performing various other operations or variations of the operations recited in flowchart 800. It should be appreciated that the operations of flowchart 800 may be performed by software, by firmware, by hardware or by any combination thereof.

At operation 802, the homogeneous surface detection system receives a first filtered surface image. It is noted that operation 802 can be performed in a wide variety of ways. For example, the homogeneous surface detection system can receive the first surface image in any manner similar to that described herein, but is not limited to such. At operation 804, the homogeneous surface detection system generates a plurality of values by performing a plurality of auto correlations with the first surface image and a copy of the first surface image. It is noted that the plurality of values includes a first peak value. It is understood that operation 804 can be performed in diverse ways. For example, the homogeneous surface detection system can generate the plurality of values by performing the plurality of auto correlations in any manner similar to that described herein, but is not limited to such.

At operation 806 of FIG. 8, the homogeneous surface detection system determines if a normalized second peak value of the plurality of values satisfies a defined condition associated with a value. If not, the homogeneous surface detection system proceeds to operation 810. However, if the homogeneous surface detection system determines that the normalized second peak value satisfies the defined condition associated with the value, the homogeneous surface detection system proceeds to operation 808. It is understood that operation 806 can be implemented in a wide variety of ways. For example, the defined condition of operation 806 may be that the normalized second peak value is less than the value which can be a threshold value or a defined limit. Alternatively, the defined condition of operation 806 may be that the normalized second peak value is less than or equal the value. However, the defined condition of operation 806 is not limited to these exemplary embodiments.

At operation 808, the homogeneous surface detection system causes an optical navigation system to utilize a homogeneous surface image filter with a subsequent unfiltered navigation surface image. It is appreciated that operation 808 can be implemented in diverse ways. For example, the homogeneous surface detection system can cause the optical navigation system to utilize the homogeneous surface image filter in any manner similar to that described here, but is not limited to such. Upon completion of operation 808, the homogeneous surface detection system ends process 800.

At operation 810 of FIG. 8, the homogeneous surface detection system causes the optical navigation system to utilize a non-homogeneous surface image filter with a subsequent unfiltered navigation surface image. It is noted that operation 810 can be implemented in a wide variety of ways. For example, the homogeneous surface detection system can cause the optical navigation system to utilize the non-homogeneous surface image filter in any manner similar to that described here, but is not limited to such. Upon completion of operation 810, the homogeneous surface detection system ends process 800.

Figure 9:
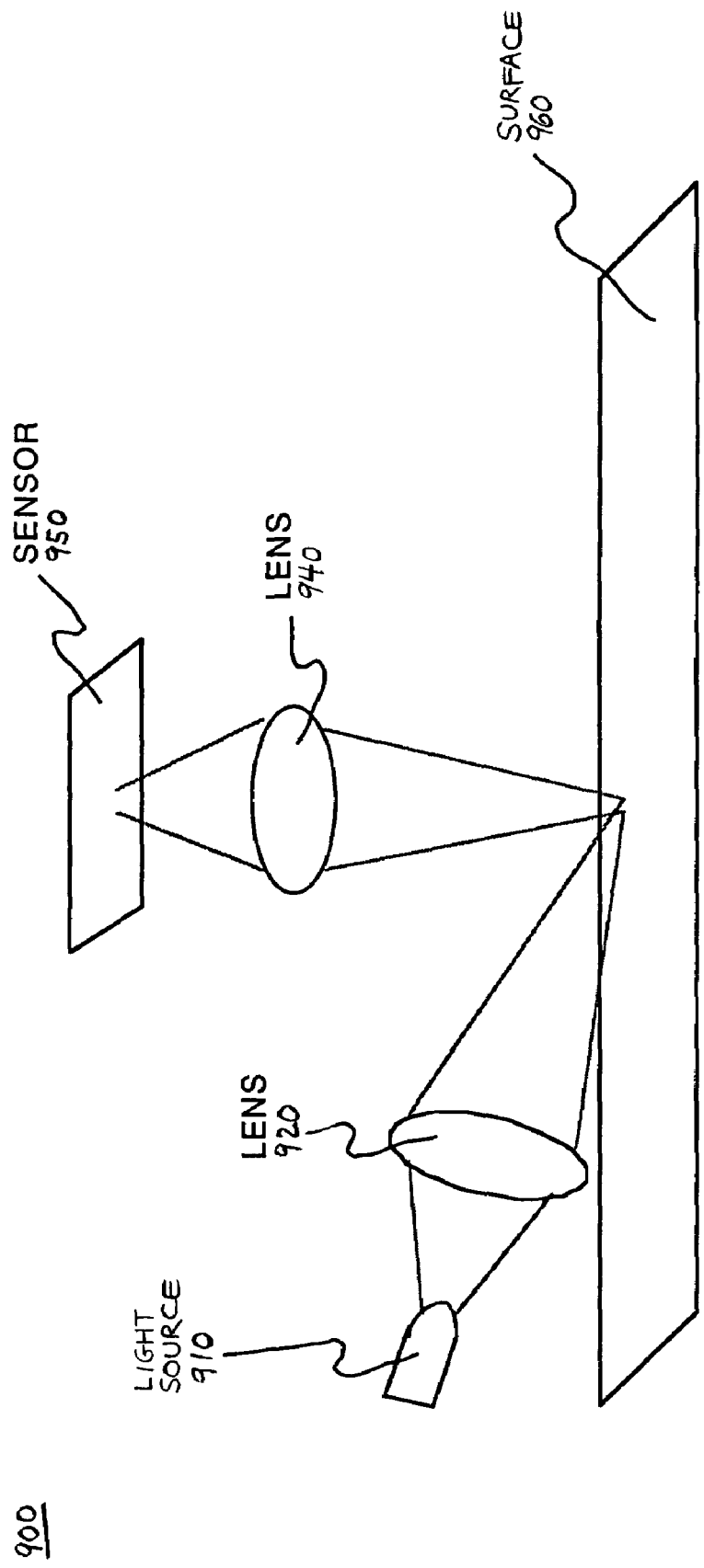
FIG. 9 is a block diagram of an exemplary image acquisition system, in an embodiment in accordance with the invention.

FIG. 9 is a block diagram of an exemplary image acquisition system 900, in an embodiment in accordance with the invention. It is noted that image acquisition system 900 may be utilized to implement part of the image acquisition module 104 of FIG. 1. The image acquisition system 900 includes a light source 910, a first lens 920, a second lens 940 and an optical sensor 950. The light source 910 emits light and can be implemented as a light emitting diode (LED). The first lens 920 focuses the light from the light source 910 on a given area of a surface 960. The light is reflected from surface 960 and is focused on the optical sensor 950 (e.g., camera chip) by the second lens 940. It is noted that small changes in the reflected light are sufficient to generate usable data for output to an optical navigation engine of an optical mouse. It is appreciated that as the optical mouse (not shown) is moved over surface 960, the optical light source 910, first lens 920, second lens 940 and optical sensor 950 all move relative to the movement of the optical mouse.

In one embodiment in accordance with the invention, the optical sensor 950 can detect light reflected off of microscopic textural features of surface 960 at a rate of, but not limited to, 100 images or more per second. It is noted that each image can contain, but not limited to, 100 or more pixels. For example, the image formed by the optical sensor 950 can be, but is not limited to, 20 pixels wide and 20 pixels long. Furthermore, each pixel can be, but is not limited to, approximately 60 micrometers ($\mu m$) by 60 $\mu m$ in dimension.

The foregoing descriptions of specific embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for detecting a homogeneous surface, said method comprising:
   generating a plurality of values by performing a plurality of auto correlations with a first surface image and a copy of said first surface image, said plurality of values comprises a first peak value;
   determining a second peak value from said plurality of values and normalizing said second peak value to produce said normalized second peak value, wherein said normalizing comprises dividing said second peak value by said first peak value;
   determining if the normalized second peak value of said plurality of values satisfies a defined condition associated with a threshold value to detect said homogeneous surface; and
   utilizing a surface image filter with a second surface image based on if said normalized second peak value satisfies said defined condition associated with said threshold value.

2. The method as described in claim 1, further comprising:
   utilizing a homogeneous surface image filter with the second surface image, provided said normalized second peak value satisfies said defined condition associated with said threshold value.

3. The method as described in claim 2, wherein said utilizing is performed by an optical navigation system.

4. The method as described in claim 1, further comprising:
   utilizing a non-homogeneous surface image filter with the second surface image, provided said normalized second peak value does not satisfy said defined condition associated with said threshold value.

5. The method as described in claim 4, wherein said utilizing is performed by an optical navigation system.

6. The method as described in claim 1, wherein said generating said plurality of values comprises utilizing a plurality of offset values.

7. The method as described in claim 1, wherein said determining said normalized second peak value comprises determining a maximum value from a subset of values of said plurality of values.

8. The method as described in claim 1, wherein said method is associated with an optical navigation system.

9. The method as described in claim 1, wherein said defined condition is that said normalized second peak value is less than said value.

10. A surface detection system for detecting a homogeneous and plain surface, said system comprising:
    an auto correlation module that generates a plurality of values by performing a plurality of auto correlations with a surface image and a copy of said surface image, said plurality of values comprises a first peak value;
    a second peak determination module that determines a second peak value from said plurality of values;
    a second peak normalizer module that normalizes said second peak value, wherein said second peak normalizer module normalizes said second peak value utilizing said first peak value;
    a comparison module that determines if said normalized second peak value satisfies a defined condition associated with a threshold value to detect said homogeneous and plain surface; and
    a filter selection module that implements which filter is used by an optical navigation system based on if said normalized second peak value satisfies said defined condition associated with said threshold value.

11. The system of claim 10, further comprising:
    an image acquisition module that captures and filters said surface image.

12. The system of claim 10, wherein said auto correlation module generates said plurality of values by performing said plurality of auto correlations utilizing a plurality of offset values.

13. The system of claim 10, wherein said second peak determination module determines said second peak value by determining a maximum value from a subset of values of said plurality of values.

14. The system of claim 10, wherein said defined condition is that said normalized second peak value is less than said threshold value.

15. A surface detection system for detecting a homogeneous surface, said system comprising:
    means for generating a plurality of values by performing a plurality of auto correlations with a surface image and a copy of said surface image, said plurality of values comprises a first peak value;
    means for ascertaining a second peak value from said plurality of values;
    means for normalizing said second peak value, wherein said means for normalizing said second peak value comprises means for dividing said second peak value by said first peak value;

means for ascertaining whether a normalized second peak value of said plurality of values satisfies a defined condition associated with a threshold value to detect said homogeneous surface; and means for causing which image filter is used by an optical navigation system based on whether said normalized second peak value satisfies said defined condition associated with said threshold value.

16. The system of claim 15, wherein said means for ascertaining said normalized second peak value comprises ascertaining a maximum value from a subset of values of said plurality of values.

17. The system of claim 15, further comprising:
means for capturing and filtering said surface image.

18. The system of claim 15, wherein said performing said plurality of auto correlations comprises utilizing a plurality of offset values.

19. The system of claim 15, wherein said first peak value comprises a center auto correlation value of an auto correlation matrix, and said second peak value comprises an outer perimeter auto correlation value of said auto correlation matrix.

20. The system of claim 15, wherein said means for normalizing said second peak value comprises means for dividing said second peak value by said first peak value.

21. The system of claim 20, wherein said first peak value comprises a center auto correlation value of an auto correlation matrix, and said second peak value comprises an outer perimeter auto correlation value of said auto correlation matrix.

* * * * *

UNITED STATES PATENT AND TRADEMARK OFFICE
CERTIFICATE OF CORRECTION

PATENT NO. : 7,382,935 B2 Page 1 of 1
APPLICATION NO. : 10/703310
DATED : June 3, 2008
INVENTOR(S) : Tong Sen Liew et al.

It is certified that error appears in the above-identified patent and that said Letters Patent is hereby corrected as shown below:

Title Page, Item (75), (Inventors), Line 2, delete "S langor" and insert -- Selangor --.

Signed and Sealed this

Eighth Day of June, 2010

David J. Kappos
*Director of the United States Patent and Trademark Office*